P. C. Ste MARIE.
SPITTOON.

No. 190,924. Patented May 15, 1877.

WITNESSES: INVENTOR:
W. W. Hollingsworth Pierre C. Ste Marie
Solon C. Kemon BY

ATTORNEYS.

N. PETERS, PHOTO-LITHOGRAPHER, WASHINGTON, D. C.

UNITED STATES PATENT OFFICE.

PIERRE CELESTIN STE. MARIE, OF MONTREAL, QUEBEC, CANADA.

IMPROVEMENT IN SPITTOONS.

Specification forming part of Letters Patent No. 190,924, dated May 15, 1877; application filed March 6, 1877.

*To all whom it may concern:*

Be it known that I, PIERRE CELESTIN STE. MARIE, of Montreal, Province of Quebec, Dominion of Canada, have invented a new and useful Improvement in Spittoons; and I do hereby declare that the following is a full, clear, and exact description of the same.

The chief object of the invention is to furnish a spittoon which shall be so constructed that when overturned its contents cannot escape, and whose cover is at the same time made removable, in the usual manner, to enable the receptacle or reservoir of the spittoon to be conveniently emptied and cleansed.

To this end I provide the funnel-shaped cover of the spittoon with a vertical circular pendent flange, which is concentric with the inner sides of the body of the spittoon, and rests, when the cover is in place, upon the bottom of the receptacle or reservoir of the spittoon.

The invention further relates to providing the spitton with casters, to enable it to be easily pushed over the floor from one place to another, and to constructing the base with bosses or projections to receive the pivots of the casters, as hereinafter more fully described.

Figure 1:
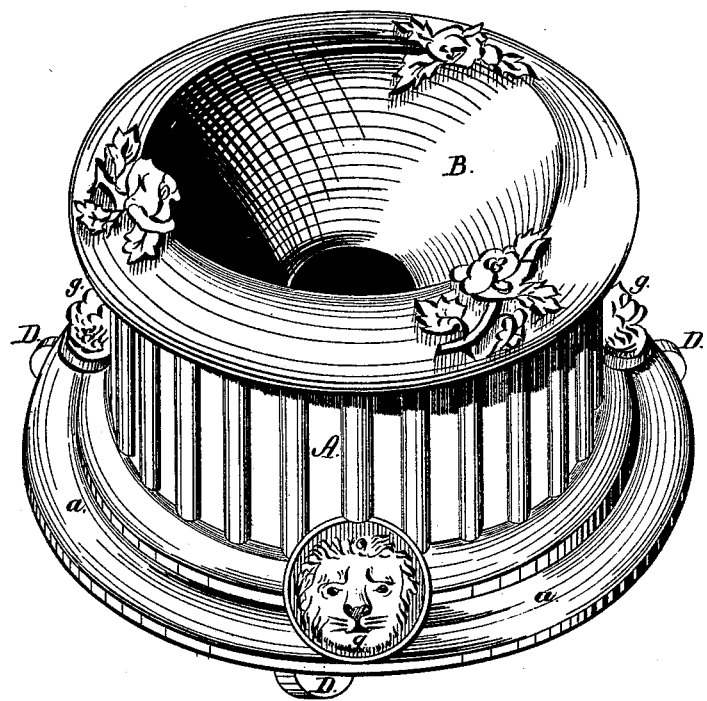
Figure 2:
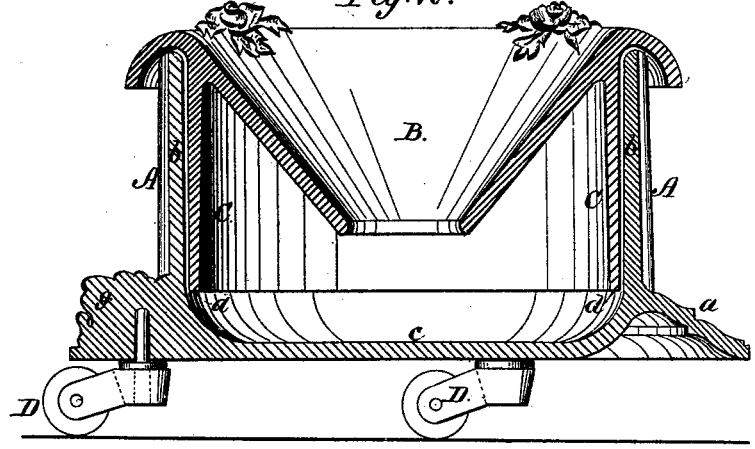
Figure 2:

In the accompanying drawing, forming part of this specification, Figure 1 is a perspective view of my improved spittoon. Fig. 2 is a sectional elevation of the same.

The body A of the spittoon has an inclined base-flange, $a$, and both are provided with suitable ornamentation exteriorly. The funnel B is constructed in the usual form, and provided with a circular pendent rim or flange, C, which is of the same length as the vertical portion $b$ of the body A, and also made concentric therewith. The rim or flange is of such diameter that it fits loosely within the reservoir or receptacle A, and its lower edge rests at $d$ on the rounded shoulder formed at the junction of the side $b$ and base $c$ of the receptacle. By this construction, in case the spittoon is overturned, the rim or flange C, together with the funnel proper, B, serves as a cup to receive the contents of the reservoir A, and thus prevents the same being spilled on the floor or carpet of the apartment.

The funnel B and rim C are formed in one piece, and may, hence, be removed together, when required, for the purpose of emptying and cleansing the reservoir.

The spittoon is provided with casters D to enable it to be easily pushed with the foot in any direction over the floor. The pintles or pivots $f$ of the casters are fixed in sockets formed in the base $a$ of the spittoon. To provide a suitable thickness of metal in which to form said sockets, and at the same time avoid the necessity of constructing the entire base thick and heavy, I construct the latter with bosses or projections $g$, which are ornamented or embellished with medallions, representing lions' heads in relief.

I am aware of Patent No. 185,430, and claim nothing therein shown or described.

What I claim is—

1. The combination, with the body or reservoir A, having the rounded shoulder $d$, of the funnel-shaped top B, having the rim or flange C pendent within the part A, and concentric with the inner side of the same, as and for the purpose specified.

2. In combination with body A and base-rim $a$, having the bosses or projections $g$, the casters D, having pivots fixed in sockets formed in said projections, as shown and described.

PIERRE CELESTIN STE. MARIE.

Witnesses:
 LOUIS RICHARD,
 EDMOND LEBRUN.